(12) United States Patent
Li

(10) Patent No.: US 8,919,189 B2
(45) Date of Patent: *Dec. 30, 2014

(54) EXTERNAL TIRE PRESSURE SENSING DEVICE AND SEALABLE VENTING MEMBER THEREOF

(75) Inventor: Zhitao Li, Zhongshan (CN)

(73) Assignee: Steelmate Co., Ltd (CN)

( * ) Notice: Subject to any disclaimer, the term of this patent is extended or adjusted under 35 U.S.C. 154(b) by 102 days.

This patent is subject to a terminal disclaimer.

(21) Appl. No.: 13/640,210

(22) PCT Filed: Nov. 16, 2011

(86) PCT No.: PCT/CN2011/082250
§ 371 (c)(1),
(2), (4) Date: Oct. 9, 2012

(87) PCT Pub. No.: WO2013/037165
PCT Pub. Date: Mar. 21, 2013

(65) Prior Publication Data
US 2013/0061667 A1    Mar. 14, 2013

(30) Foreign Application Priority Data
Sep. 13, 2011 (CN) .......................... 2011 1 0269787

(51) Int. Cl.
*B60C 23/02* (2006.01)
*B60C 23/04* (2006.01)

(52) U.S. Cl.
CPC ......... *B60C 23/0496* (2013.01); *B60C 23/0408* (2013.01)
USPC ........................................................ 73/146.3

(58) Field of Classification Search
USPC ................................................. 73/146–146.8
See application file for complete search history.

(56) References Cited

U.S. PATENT DOCUMENTS

| 7,336,162 | B2 * | 2/2008 | Stack et al. | 340/442 |
| 8,373,551 | B2 * | 2/2013 | Laird et al. | 340/442 |
| 2003/0046992 | A1 * | 3/2003 | Caretta | 73/146 |

* cited by examiner

*Primary Examiner* — Andre Allen
(74) *Attorney, Agent, or Firm* — Lerner, David, Littenberg, Krumholz & Mentlik, LLP

(57) ABSTRACT

An external tire pressure sensing device and a sealable venting member thereof are provided. The sealable venting member is placed inside the external tire pressure sensing device. The venting member is of an integral part and includes a supporting platform for tightly contacting with a sensor, a communication portion located at one side of the supporting platform and used to lift of a gas outlet valve of a gas nozzle, and a communicating hole for interconnecting the gas nozzle and a sensing portion of the sensor located on the top portion of the supporting platform. The sealable venting member has the advantages of small axial dimension, good sealability, reliable connection and high safety, thus further reducing the size of the external tire pressure sensing device.

8 Claims, 4 Drawing Sheets

EXTERNAL TIRE PRESSURE SENSING DEVICE AND SEALABLE VENTING MEMBER THEREOF

CROSS-REFERENCE TO RELATED APPLICATIONS

The present application is a national phase entry under 35 U.S.C. §371 of International Application No. PCT/CN2011/082250 filed Nov. 16, 2011, which claims priority from Chinese Patent Application No. 201110269787.8 filed Sep. 13, 2011, all of which are incorporated herein by reference.

FIELD OF THE INVENTION

The invention relates to a device for sensing the automobile tire pressure and more particularly, relates to an external tire pressure sensing device and sealable venting member thereof.

BACKGROUND OF THE INVENTION

From kinds of patent databases throughout the world, many patent documents related to automobile tire pressure sensing device can be searched out. The technical solutions disclosed in these patent documents may differ from one another. The sensing devices manufactured according to these technical solutions however, suffer from the problem such as big size of the sensing device in particular big size of the sensing device in radial direction due to connection among various components and limitation of the nature of the components. Consequently these sensing devices fail to have their application in all kinds of automobile. As a result, a prior art external tire pressure sensing device is mounted generally onto the tire with big size (for example the tire of a truck). In case that the sensing device is installed into a small-sized car, the sensing device will look big in size. Specifically, the dimension of the sensing device will beyond the distance between the gas nozzle shaft and the outermost rim of the hub of the car. In this case, the sensing device will be exposed out of the outermost plane of the tire, and is susceptible to collision damage caused by obstacle or person, thus resulting in malfunction of the sensing device.

The undue big dimension of the sensing device may be resulted from axial dimension and radial dimension of the sensing device. It is because normally the gas nozzle is angled with respect to the outer side surface of the tire and correspondingly, the sensing device installed on the gas nozzle is also angled outwardly. In this case, the axial height and radius of the sensing device itself together determine the offset distance of the sensing device from the plane defined at the outermost side of the tire. Apparently, the size of the sensing device may be reduced either by reduction of the radial size or by reduction of the height of the sensing device. To this end, the internal construction of the entire sensing device should be optimized. By now, on one hand, all prior art technology fail to realize this object, as it is not easy to arrange many components and electrical elements inside extremely limited internal space of the sensing device. On the other hand, sealable venting construction, which is formed by lamination of multiple separate components, also makes it impossible to further reduce the axial size of the venting construction.

A typical external tire pressure detection transmitter is disclosed in Chinese Patent No. 2826556. The transmitter contain complex components such as the printed circuit board disposed on the upper portion of a button battery for mounting an antenna thereon, the circuit board disposed on the lower portion of the button battery, and the gas-conducting construction constituted by multiple complicated and separate components. This of course increases the axial height of the transmitter. In addition, kinds of wire conduits for realizing electrical connection among the components arranged axially also necessarily increase the radial dimension of the transmitter. Clearly, the external tire pressure detection transmitter made according to the above technology is large in size and can only find its application in large-sized truck tire. Though it can also be mounted in a normal car, it will be susceptible to damage problems discussed above. Other patent documents searched out by the inventor also suffer from the same problem.

It is apparent from the above analysis that conventional physical construction doesn't work to significantly reduce the size of the external tire pressure sending device, thus failing to be mounted into tire of all kinds of automobile.

SUMMARY OF THE INVENTION

One object of the invention is to optimize a sealable venting construction inside an external tire pressure sensing device.

Another object of the invention is to provide an external tire pressure sensing device.

To achieve the above object, the following technical solution is provided.

A sealable venting member is provided inside an external tire pressure sensing device. The venting member is of an integral part and includes a supporting platform for tightly contacting with a sensor, a communication portion located at one side of the supporting platform and used to lift off a gas outlet valve of a gas nozzle, and a communicating hole for interconnecting the gas nozzle and a sensing portion of the sensor located on the top portion of the supporting platform.

A transition portion is disposed between the supporting platform and communication portion. A circular notch is defined in the transition portion for engaging a circular member of the sensing device. The transition portion is of a cylinder shape.

Preferably, the communicating hole extends through the supporting platform and transition portion. Alternatively, the communicating hole extends through the supporting platform transition portion and communication portion.

The supporting platform is of a rectangular shape and is provided with rounded corners by which the supporting platform can be fixed by corresponding frame into place.

The external tire pressure sensing device of the invention incorporates the aforementioned sealable venting member.

Compared with prior art, the invention has the following advantages.

The integral sealable venting member of the invention has many functions. For example, it can push out the gas outlet valve of the gas nozzle, realize venting purpose, seal the entire gas nozzle by engagement between the circular notch and stepped ring of the base, and seal the entire sensor by its supporting platform. The venting member has many functions and is easy to be manufactured. As the venting member is an integral component, and the circular notch is defined between the communication portion and supporting platform, the engagement between the circular notch and stepped ring of the base makes it possible to significantly reduce the axial height of the whole venting member, thus the axial height of the entire product being reduced as well. Comparatively, prior art construction has greatly increased axial height because that the communication portion, base and supporting platform are separate components and the relative location among them must be maintained reliably.

DETAILED DESCRIPTION OF THE INVENTION

Various embodiments of the invention will be described below in further detail with reference to the accompanying drawings.

Figure 1:
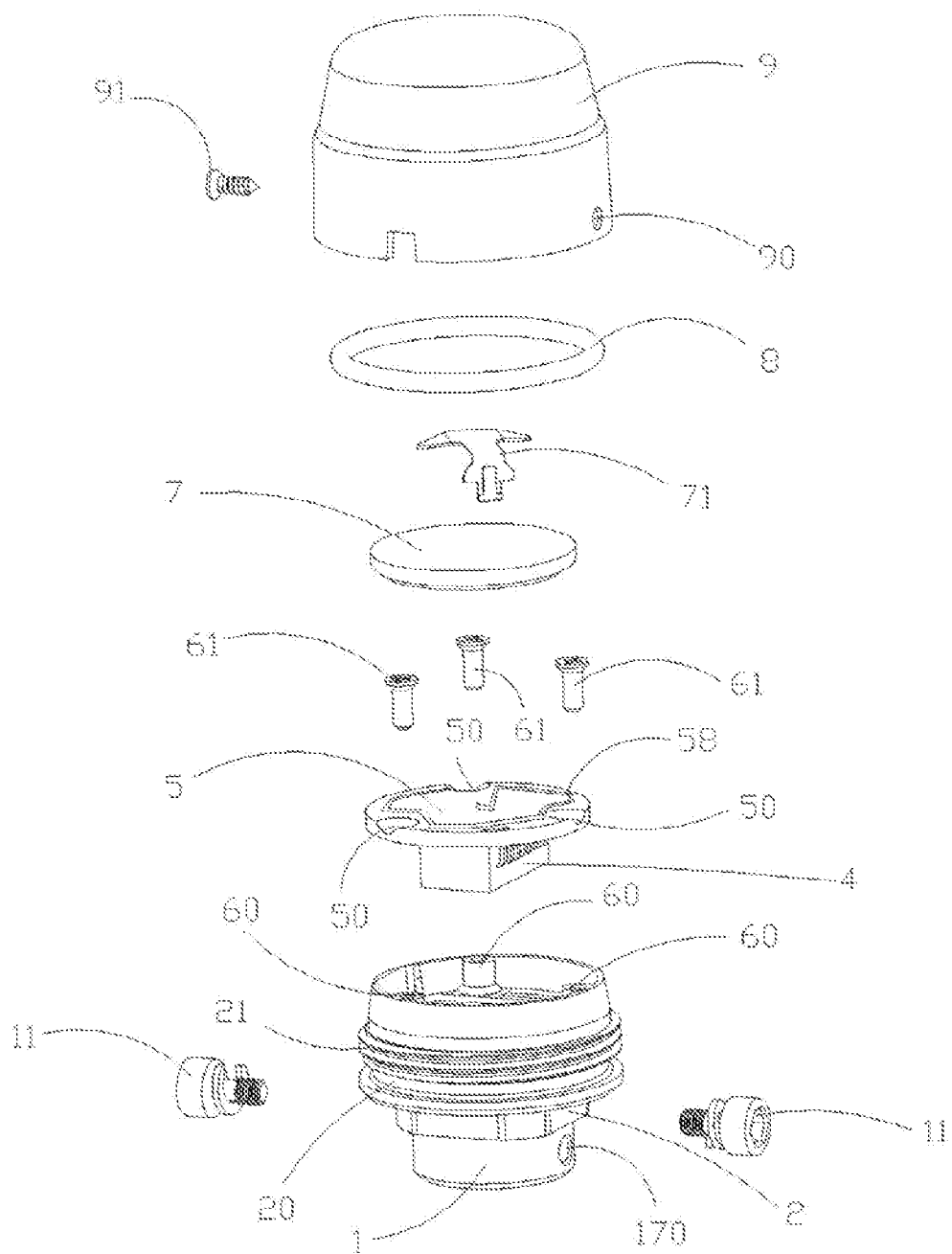
FIG. 1 shows an exploded perspective view of an external tire pressure sensing, device incorporated with a sealable venting member of the present invention.

Reference is made to FIG. 1. A tire pressure sensing device into which the sealable venting member of the invention is applied includes from bottom to top a base 1, an inner suite 2, a sensor 4, a circuit board 5, a button battery 7 and an outer suite 9. The inner suite 2 is sleeved on the periphery of the base 1 and the inner suite 2 is secured with the outer suite 9 so as to form a packaging suite. The inner space defined inside the packaging suite is used to accommodate the rest of the above-mentioned components. There are some cooperative components such as a plurality of screws 61, threaded posts 60, a rubber ring 8 and a battery pressing tab 71 all of which will be described later. The direction from the bottom to top of the sensing device is defined as axial direction, while the direction normal to the axial direction is defined as radial direction.

Figure 2:
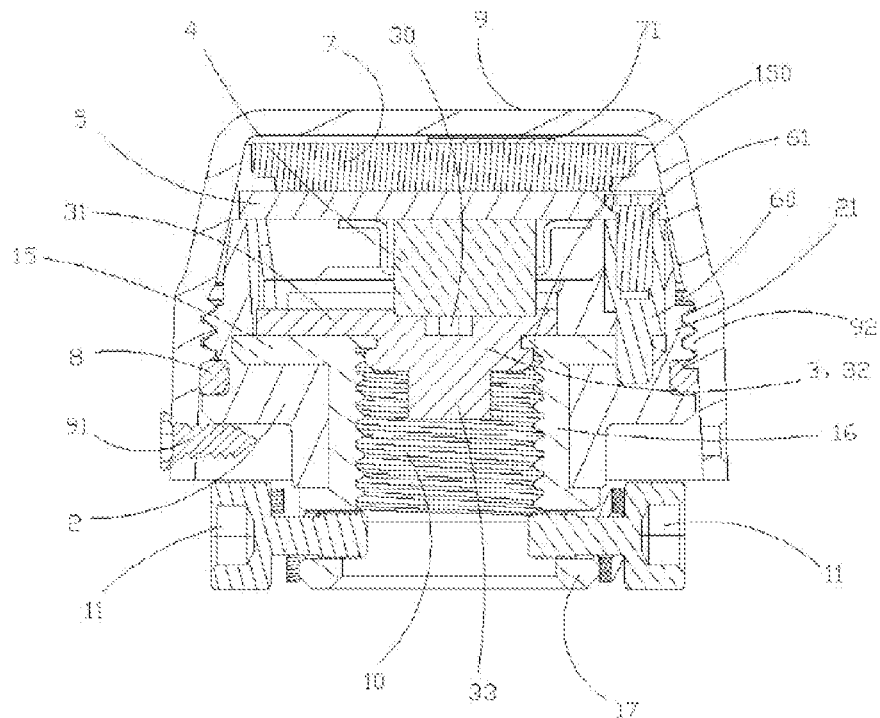
FIG. 2 shows an assembled and cross-sectional view of the external tire pressure sensing device incorporated with a sealable venting member of the present invention.
Figure 3:
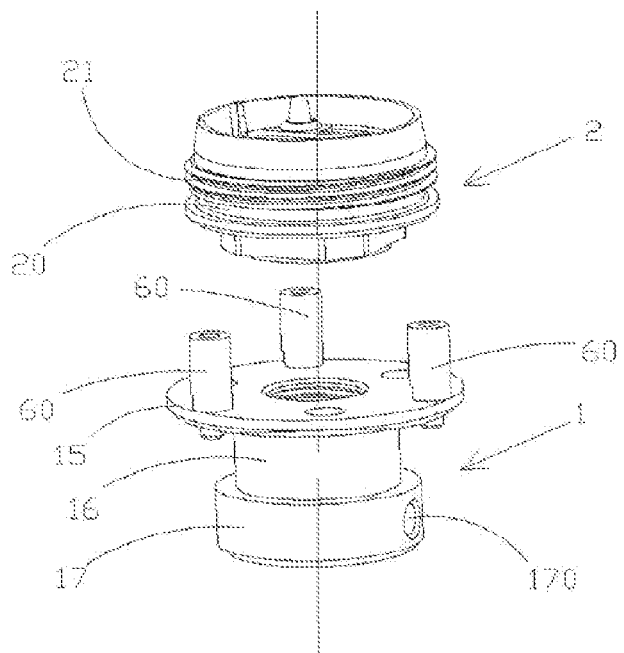
FIG. 3 shows assembling relationship among a threaded post, an inner suite and a base shown in FIG. 1.

Referring to FIGS. 1-3, the base 1 includes a cylindrical main body 16 within which a screw hole 10 is defined, an extension cylinder 17 extended from the bottom of the main body 16, and a circular platform 15 disposed on the top of the main body 16. The circular platform 15 has a larger diameter than the main body 16 so as to support other components located on the platform 15. Three locating holes are defined evenly circumferentially in the circular platform 15 in order to locate (or lock) the above-mentioned three threaded posts 60. The screw hole 10 of the main body 16 extends through the top surface of the circular platform 15. The central portion of the platform 1 communicates with the screw hole 10. In addition, the inner diameter of the platform 15 is smaller than that of the screw hole 10 so that a stepped ring 150 is defined on the top portion of the screw hole 10 by the circular platform 15. The extension cylinder 17 is hollow and is extended upon the bottom of the main body 16. A pair of screw holes 170 is defined radially in a circumferential wall of the extension cylinder 17. When the gas nozzle passes across the extension cylinder 17 and is secured with the screw hole 10 of the main body 16, two screws 11 may pass through the pair of screw holes 170 of the cylinder 17 and therefore be rigidly secured on the circumferential wall of the gas nozzle, thus enhancing connection between the base 1 and gas nozzle. The circular platform 15, main body 16 and extension cylinder 17 of the base 1 are formed integrally.

Figure 4:
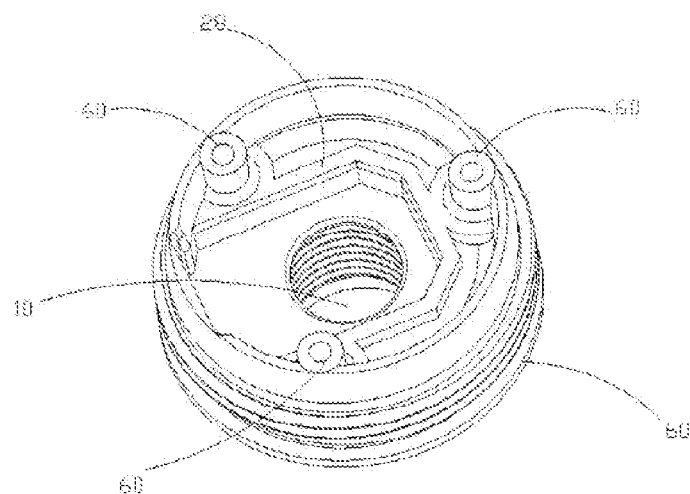
FIG. 4 shows a top perspective view of the construction shown in FIG. 3.

Reference is made to FIGS. 2 and 3. The inner suite 2 is made of rubber and is used to receive the main body 16 and circular platform 15 of the base 1 therein. Reference is also made to FIG. 4. On the top surface of the circular platform 15, a frame 28 of the inner suite 2, which is used to surround and locate the supporting platform of the sealable venting member, is formed. The frame 28 is pressed tightly against the top surface of the circular platform 15. A thread 21 is formed on an outer wall of the inner suite 2 so as to engage the thread 92 defined on an inner wall of the outer suite 9. The inner suite 2 includes a circular groove 20 defined on the bottom end of the thread 21 for receiving said rubber ring 8. Referring to FIG. 4, plural through holes are defined in the inner suite 2 through which the threaded posts 60 may pass. After the inner suite 2 is secured with both of the base 1 and threaded posts 60 disposed on the base 1, the sealable venting member of the sensing device of the invention ma be installed therein.

Figure 5:
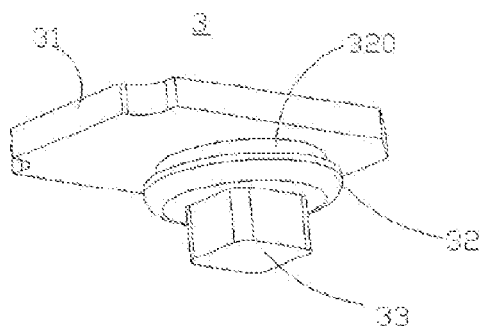
FIG. 5 shows a perspective view of a sealable venting member of the external tire pressure sensing device according to a preferred embodiment of the present invention.
Figure 6:
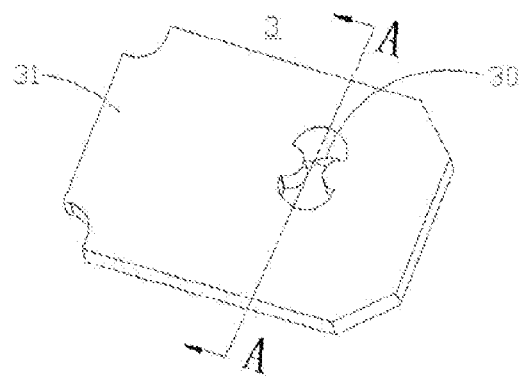
FIG. 6 shows another perspective view of a sealable venting member of the external tire pressure sensing device according to a preferred embodiment of the present invention.
Figure 7:
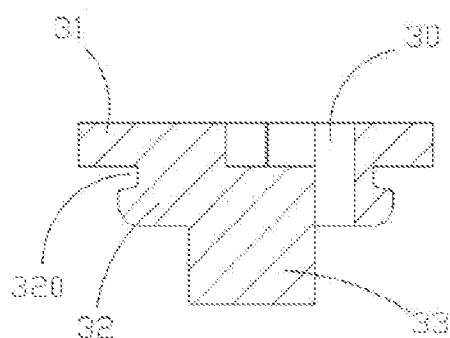
FIG. 7 shows a cross sectional view along A-A line of FIG. 6.

Referring to FIGS. 2, 5 and 7, the sealable venting member 3 of the sensing device of the invention is an integral component, and includes a plate-shaped supporting platform 31 located on the top of the venting member 3 and a communication portion 33 located on the bottom thereof for pushing out the gas outlet valve of the gas nozzle. A transition portion 32 is defined between the supporting platform 31 and communication portion 33. The transition portion 32 is of a cylindrical shape, and a circular notch 320 is defined in the circumferential wall of the transition portion 32. The dimension of the notch 320 is commensurate with that of the stepped ring 150 of the circular platform 15 of the base 1 such that the communication portion 33 of the sealable venting member 3 can be inserted into the screw hole 10 of the base 1, thereby realizing tight engagement between the member 3 and base 1 via the tight engagement between the stepped ring 150 of the based and circular notch 320 of the transition portion 32. This ensures that gas flow will not escape from the interface between the stepped ring 150 of the circular platform 15 of the base 1 and transition portion 32 of the venting member 3, thus achieving highly sealing effects. To make sure that the gas pressure inside the tire can be measured by the sensor 4 after the gas outlet valve of the gas nozzle is lifted up by the transition portion 32 of the sealable venting member 3, a communication hole 30 is defined in the sealable venting member 3 at a location biased from the axis of the sensor of the invention. Specifically, as shown in FIG. 7, the communication hole 30 passes through the transition portion 32 and supporting platform 31, thus the gas flow being able to travel across the screw hole of the base 1 and space defined at the top portion of the supporting platform 31 the communication hole 30 is designed to have a shape at the top surface of the supporting platform 31 corresponding to that of a sensing portion of the sensor 4 with the purposes of prevention of gas from escaping, thus not influencing the measurement precision. By the same token, the top surface of the supporting platform 31 is flat so as to engage with the entire bottom surface of the sensor 4 for preventing gas escaping. As the sealable venting member 3 is of integral part and tightly engaged with the base 1, the axial height of the member 3 is significantly low, thus reducing the axial height of the entire sensing device.

The supporting platform 31 of the sealable venting member 3 of the invention is designed to be a rectangular shape and is provided with rounded corners. When the supporting platform 31 is surrounded by the frame 28, engagement between the rounded corners and extrusion portion predefined on the frame 28 can better limit the location of the platform 31, thus realizing more reliable connection.

In an embodiment not illustrated in the figures, the communicating hole 3 of the sealable venting member 3 of the invention extends through the supporting platform 31, transition portion 32 and communication portion 33.

Referring to FIGS. 1 and 2, three through holes 50 corresponding to three threaded posts 60, are defined in the circuit board 5. Three screws 61 pass through these holes 50 and then are locked with the posts 60 respectively, hence securing the circuit board 5 into the sensing device. Circuitry for realizing electrical function of the sensing device is printed and integrated into the top and bottom surfaces of the circuit board 5. The sensor 4 is also welded onto the bottom surface of the circuit board 5. Accordingly, the sensor 4 is disposed just between the circuit board 5 and the supporting platform 31 of the sealable venting member 3. In addition, the sensor 4 and the supporting platform 31 are secured firmly with each other under the action of the three screws 61, thus making sure that no gas will escape out of the sensing portion of the sensor 4 from the gas nozzle except for the communication hole 30 of the sealable venting member 3. As shown in FIG. 1, a micro-strip line 58 is circumferentially disposed on the outer periphery of the top surface of the circuit board 5. One end of the micro-strip line 58 is connected with the control circuit, while the other end thereof is extended to one of the through holes 50. As such, when a screw 61 is inserted into the through hole 50, the micro-strip line 58, the screw 61, the threaded post 60 engaged with the above screw 61, the base 1 and the gas nozzle constitute together an antenna construction for transmitting and receiving the signal. The micro-strip line 58 functions to match impedance and extend the length of the antenna constructed of the above screw 61, threaded post 60, base 1 and gas nozzle. The existence of the micro-strip line 58 enhances the capability of signal transmission of the antenna constructed of the above-mentioned components. This ensures that the signal generated after detection of the sensor 4 can be transmitted into free space through said antenna construction under the control of the control circuit. By this manner, the above signal can be steadily and reliably transferred to a monitor unit of the tire pressure system so as to be further processed.

Referring to FIGS. 1 and 2 the button battery 7 is placed on the top surface of the circuit board 5. The battery pressing tab 71 is positioned on the top portion (positive electrode) of the battery 7. The battery pressing tab 71 along with a negative electrode connection portion printed on the top portion of the circuit board 5 are the components of the control circuit. By the connection function of the pressing tab 71 and the negative electrode connection portion with the both electrodes of the button battery 7, the battery 7 supplies power to the entire control circuit. Being supplied with power of the battery 7, the sensor 4 is able to work normally.

Reference is made again to FIGS. 1 and 2. The outer suite 9, which forms together with the inner suite 2 the packaging suite, is of an inverted conical shape. In the outer suit 9 the thread 92 is defined to engage with the thread 21 of the inner suite 2. A plurality of screw holes 90 is defined circumferentially on the bottom portion of the outer suite 9. These screw holes 90 pass radially through the outer suite 9. A plurality of screws 91 pass through these screw holes 90 respectively such that the end surface of each screw 91 is pressed against the bottom surface of the inner suite 2. As a result, once the outer suite 9 and inner suite 2 are assembled with each other, the interior construction of the packaging suite will not be damaged by simply rotating the outer suite 9 unless the screws 91 are removed, thus the entire sensing device being protected effectively.

With reference to above respective figures, the assembling procedure of the external tire pressure sensing device into which the sealable venting member of the invention is incorporated is described as follows.

At first, the threaded posts 60 are located inside corresponding holes of the circular platform 15 of the base 1. After that, the inner suite 2 is sleeved on the base 1 and threaded posts 60. Next, the communication portion 33 of the sealable venting member 3 is placed into the screw hole 10 of the base 1 such that the circular notch 320 of the member 3 is locked with the stepped ring 150 of the circular platform 15 of the base 1. At this time, the supporting platform 31 of the sealable venting member 3 is tightly positioned inside the frame 28 of the inner suite 2 such that the base 1, threaded posts 60, inner suite 2 and venting member 3 are secured strongly.

Then, the sensor 4, which is disposed on the bottom surface of the circuit board 5, is mounted such that the sensing portion of the sensor 4 engages with the communicating hole 30 of the sealable venting member 3. At locations corresponding to respective through holes 50 of the circuit board 5 and threaded posts 60, a number of screws 61 pass through the through holes 50 defined in the circuit board 5 and then are locked with respective threaded posts 60. One of the screws 61 is connected with the micro-strip line 58 which connects with both of the control circuit and the antenna.

Next, the button battery 7 is mounted on the top surface of the circuit board 5. On the top portion of the battery 7, the battery pressing tab 71 electrically connected with the control circuit is disposed, thus finishing the entire assembling process.

Finally the rubber ring 8 is sleeved on the circular groove 20 formed on the bottom portion of the screw 21 defined on the outer wall of the inner suite 21. Then, the outer suite 9 is locked with the inner suite 2 by means of a screw 91 which passes through and engages with the screw hole 90 defined on the bottom portion of the outer suite 9.

As such, the whole assembling process of the sensing device is finished. As described above, to enhance the connection between the sensing device and gas nozzle and when the extension cylinder 17 of the base 1 receives the gas nozzle therein, two screws 11 are threaded into radial screw holes 170 of the extension cylinder 17 respectively, thus making the gas nozzle secured into the extension cylinder 17 by said pair of screws 11 and making the entire construction more stable.

Figure 8:
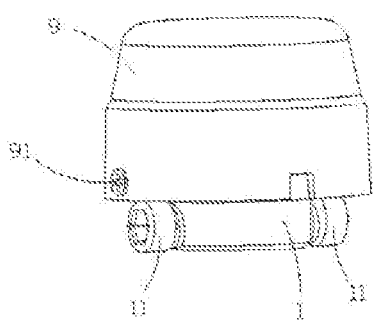
FIG. 8 shows an assembled perspective view of an external tire pressure sensing device incorporated with a sealable venting member of the present invention.

The finally assembled external tire pressure sensing device of the invention is illustrated in FIG. 8. It can be seen that the entire device is compact and has a greatest diametrical dimension of 2.32 cm. The axial distance between the bottom surface of the circular platform of the base and outer suite 9 is no more than 1.1 cm. Accordingly, the axial dimension of the entire packaging suite is also small. It is well known that for a conventional vehicle, the distance between the gas nozzle of a tire and the outermost side of the tire is often larger than 2.5 cm. Apparently the tire pressure sending device of the invention has superior adaptability to most kinds of automobiles.

In a summary the sealable venting member of the external tire pressure sensing device of the invention has the advantages of small axial dimension, good sealability, reliable connection and high safety, thus further reducing the size of the external tire pressure sensing device.

Person of ordinary skill in the art should know that the signal generated by the sensor of the invention may include but is not limited to pressure signal. For example, the signal may be temperature signal. Generally, the signal generated by electrical detection function of the sensor and to be transmitted may be transmitted is the antenna construction of the invention. These signals to be transmitted belong to the signal generated by the sensor of the invention.

Though various embodiments of the invention have been illustrated above, a person of ordinary skill in the art will understand that, variations and improvements made upon the illustrative embodiments fall within the scope of the invention, and the scope of the invention is only limited by the accompanying claims and their equivalents.

The invention claimed is:

1. A sealable venting member provided inside an external tire pressure sensing device, wherein the venting member is of an integral part and comprises a supporting platform for tightly contacting with a sensor, a communication portion located at one side of the supporting platform and used to lift off a gas outlet valve of a gas nozzle, and a communicating hole for interconnecting the gas nozzle and a sensing portion of sensor located on the top portion of the supporting platform.

2. The sealable venting member according to claim 1, wherein a transition portion is disposed between the supporting platform and communication portion; and a circular notch is defined in the transition portion for engaging a circular member of the sensing device.

3. The sealable venting member according to claim 1, wherein the transition portion is of a cylinder shape.

4. The sealable venting member according to claim 1, wherein the communicating hole extends through the supporting platform and transition portion.

5. The sealable venting member according to claim 1, wherein the communicating hole extends through the supporting platform, transition portion and communication portion.

6. The sealable venting member according to claim 1, wherein the supporting platform is of a rectangular shape.

7. The sealable venting member according to claim 6, wherein the supporting platform is provided with rounded corners.

8. An external tire pressure sensing device, comprising the sealable venting member recited in claim 1.

* * * * *